United States Patent [19]
Harkins

[11] 3,901,437
[45] Aug. 26, 1975

[54] PROGRAMMED TEMPERATURE CONTROL SYSTEM FOR A FURNACE AND THE LIKE

[75] Inventor: Robert E. Harkins, Fairmont, W. Va.

[73] Assignee: Electronic Control Systems, Inc., Fairmont, W. Va.

[22] Filed: Feb. 4, 1974

[21] Appl. No.: 439,015

[52] U.S. Cl. ................. 236/15 B; 236/46; 219/492
[51] Int. Cl.² ......................................... G05D 23/22
[58] Field of Search ............. 236/46, 15 B; 219/492

[56] References Cited
UNITED STATES PATENTS

| | | | |
|---|---|---|---|
| 2,593,562 | 4/1952 | Hornfeck | 236/46 |
| 3,043,517 | 7/1962 | Hanna | 236/46 |
| 3,301,482 | 1/1967 | Bullen | 236/46 |
| 3,311,303 | 3/1967 | Noyes | 236/46 |
| 3,692,986 | 9/1972 | Nienstaedt | 236/46 |

Primary Examiner—William E. Wayner
Attorney, Agent, or Firm—Stanley J. Price, Jr.

[57] ABSTRACT

A furnace or kiln for firing ceramic ware includes a thermocouple which supplies an output signal that is proportional to the temperature within the furnace. A slidewire potentiometer provides an output signal that corresponds to a preselected maximum temperature to be reached in the furnace to a first summing amplifier. The first summing amplifier compares the output received from the thermocouple with the output from the slidewire potentiometer as heat is supplied to the furnace. A variable voltage generator, such as a ramp generator, is operatively associated with the first summing amplifier to control the rates of heating and cooling in the furnace. The output of the ramp generator is controlled by a Zener diode network to independently adjust the intervals and rates of heating and cooling within the furnace. A combination amplifier and relay device responds to the input received from the ramp generator and the thermocouple to control the power supplied to the furnace. Power is supplied to the furnace when the output from the thermocouple exceeds that of the ramp generator. A second summing amplifier receives input from the first amplifier and actuates the ramp generator to increase or decrease the input to the power control amplifier to thereby raise or lower the furnace temperature. In this manner, a control is established to maintain the output of the ramp generator at a level equal to the output of the slidewire potentiometer. When the temperature within the furnace has risen to the preselected level as indicated by the output from the thermocouple, the second summing amplifier actuates the ramp generator to provide an output to the power control amplifier at a reduced voltage level to reduce the furnace temperature at a controlled rate which may be equal to or vary from the rate of temperature increase.

8 Claims, 4 Drawing Figures

PROGRAMMED TEMPERATURE CONTROL SYSTEM FOR A FURNACE AND THE LIKE

BACKGROUND OF THE INVENTION

1. Field of the Invention

This invention relates to a programmed temperature control system for a furnace and the like, and more particularly to an improved programmed control system for gradually heating a furnace to a preselected maximum temperature followed by a gradual cooling of the furnace in which the rates of heating and cooling are independently controlled. 2. Description of the Prior Art It is of primary importance in firing of ceramic ware that the temperature when the heat is first applied be limited to a controlled rate of increase primarily for the purpose of preventing breakage of the ware. Once a certain preselected maximum temperature has been reached it is equally important, as determined by the characteristics of the ware, that the temperature be then decreased at a controlled rate. Indiscriminate decreases from the preselected maximum temperature could impair the quality of the ware such as by "crazing" the glaze. Furthermore, moisture and other materials in the ware may volitilize if the temperature is permitted to increase in an uncontrolled manner. The entrapped products of volitilization may ultimately result in breakage of the ware.

It is well known in the art of firing ceramics, glazes and the like that the uncontrolled temperature of a furnace or kiln will at first increase very rapidly followed by a slower increase in the temperature until a maximum value is reached. It is, therefore, necessary to protect the ware by controlling the rate at which the temperature increases particularly during the early stages of the firing. Furthermore, in firing ceramic products and glazes the kiln temperature must be increased to a maximum firing temperature which is determined by the composition of the material being fired (typically about 2000°F.) to be followed by a gradual decrease in the furnace temperature to about room temperature. Prior to the controlled decrease in temperature and depending upon the requirements of the firing process, the temperature may be required to be maintained at the preselected maximum temperature for a desired time interval or soak period. The time required to reach a maximum temperature may vary from 5 to 12 hours. In most cases the operator is dependent upon indicating devices only to determine whether the maximum temperature has been reached and must personally monitor the soak time at the preselected maximum temperature before the temperature is reduced.

Circuits for preventing overshooting of the temperature above the maximum desired temperature to be reached in a furnace are known and an example of such is illustrated in U.S. Pat. No. 2,874,906. By use of a predicting analog the startup of the process is controlled to increase the furnace temperature from an ambient temperature to a desired set point temperature. Then the process input is shut off at a time prior to the actual reaching of the set point temperature. Once the temperature in the furnace has reached the desired set point temperature, it may be then reduced or input supplied to the programmer to maintain the furnace temperature for an indefinite period of time at the desired set point temperature.

U.S. Pat. No. 3,311,303 illustrates a programmer which includes a plurality of set point potentiometers used for setting the desired levels of the programmer. An operating potentiometer is connected to a motor which drives the operating potentiometer to the output level of one of the plurality of set point potentiometers corresponding to the first temperature level to be reached in the furnace. When the furnace temperature reaches the program level of the first condition desired, and the voltage output from the furnace temperature recorder is equal to the voltage output of the operating potentiometer, the input to a temperature comparator becomes zero. Subsequently, the operating potentiometer is interrupted and the output is maintained at the first selected level.

U.S. Pat. No. 3,202,800 discloses a temperature controller for a bushing used to produce glass fibers in which a magnetic preamplifier is arranged to receive a signal proportional to the temperature of the heated bushing from a thermocouple. The thermocouple E.M.F. is combined with a millivolt reference signal from a set point temperature control and amplified to indicate any difference existing between the two signals. If a voltage signal difference exists, the temperature controller then generates a signal to actuate the furnace power source and maintain the bushing at the preselected temperature.

There is need to provide a temperature control system capable of increasing the temperature within a kiln or furnace to a desired preset temperature at a desired preset rate. Then, in the event that the actual furnace temperature should be less than the maximum required value when the temperature set point has reached the maximum value, the temperature set point must then hold at the maximum value for an indefinite time to permit the actual furnace temperature to reach that level. Then once the furnace temperature reaches the maximum value, a switching action should take place to decrease the furnace temperature at a controlled rate. Accordingly, the controlled rate of decrease should serve to prevent breaking of the ware and crazing of the glaze.

SUMMARY OF THE INVENTION

In accordance with the present invention there is provided a programmed temperature control system for a furnace and the like which includes a device for sensing the temperature in the furnace and meter for indicating the temperature in the furnace. A calibrated control device is provided for the purpose of selecting the maximum temperature desired. A variable voltage generator provides output for raising and lowering the temperature of the furnace at a controlled rate. A combination amplifier and relay device responds to output from the variable voltage generator to control the power supplied to the furnace. The variable voltage generator is operatively associated with a first summing amplifier and a Zener diode network which together function in a controlled manner to increase, to decrease or to maintain the output of the variable voltage generator at a desired output corresponding to the fixed preselected temperature in the furnace for an indefinite time interval until the temperature in the furnace reaches the preselected temperature. When the temperature in the furnace becomes equal to or slightly greater than the preselected temperature set by the temperature control device, a means is provided for reducing the temperature in the furnace at a controlled rate.

A second summing amplifier compares the E.M.F. of the temperature sensing device, which is proportional to the temperature in the furnace, with the E.M.F. of the calibrated control device, which is proportional to the preselected temperature to be provided in the furnace. When the second summing amplifier monitors a difference between the two output voltages such that the preselected temperature slightly exceeds the furnace temperature, the variable voltage generator supplies an output which actuates the combination amplifier and relay device to increase the power supply to the furnace and thus the temperature therein. However, when the two outputs are detected as being equal by the second summing amplifier, the temperature in the furnace has reached the preselected temperature, and the variable voltage generator is actuated to initiate an output at a reduced voltage level. In response to the reduced magnitude of the output from the variable voltage generator, the combination amplifier and relay device function to reduce the power supplied to the furnace and, in turn, the temperature therein.

Accordingly, the principal object of this invention is to provide a programmed temperature control system for a furnace and the like which controls the temperature of the furnace by gradually increasing the temperature to a preselected maximum level and then gradually decreasing the temperature at either the same rate or at a rate slower than the rate of temperature increase.

Another object of this invention is to provide a programmed temperature control system for a furnace and the like in which the rates of heating and cooling as well as the temperature reached in the furnace may be repeated from cycle to cycle to thereby produce ceramic ware having substantially uniform properties and characteristics.

Still another object of this invention is to provide a programmed temperature control system for a furnace or kiln which is capable of being operated automatically so as to free the operator from the necessity of continuously monitoring the system controls and from the burden of making adjustments thereto so that the quality of the ceramic ware produced is not dependent upon the expertise of the operator.

These and other objects and advantages of this invention will be more completely disclosed and described in the following specification, the accompanying diagrams and the appended claims.

DESCRIPTION OF THE PREFERRED EMBODIMENTS

Figure 1:
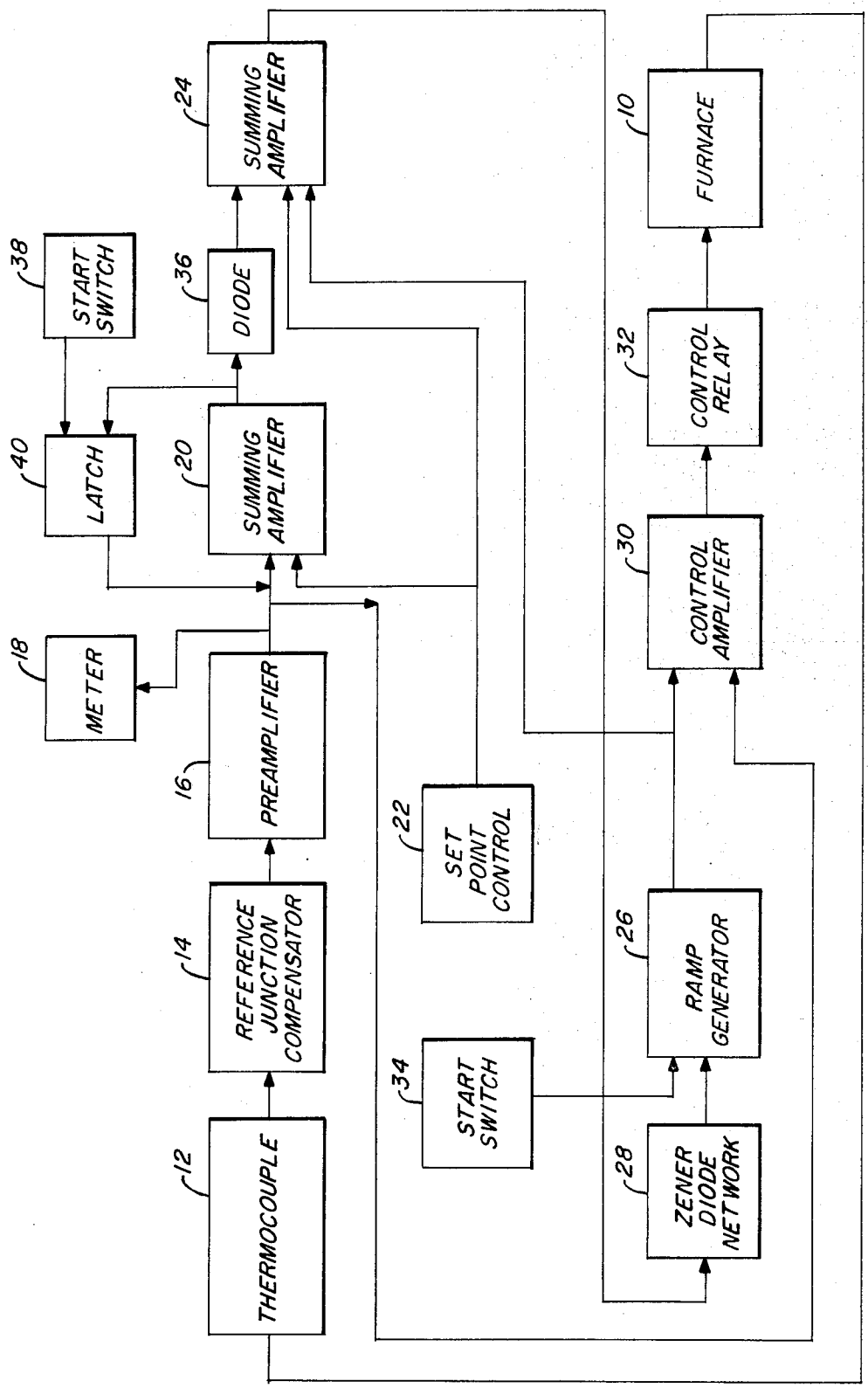
FIG. 1 is a block diagram, illustrating the control elements of the programmed temperature control system for a furnace.

Referring to FIG. 1 of the drawings, there is illustrated a block diagram of the elements provided in the programmed temperature control system which includes a furnace 10 or kiln of the type for firing ceramic ware. The furnace 10 is conventionally known in the art as a periodic furnace in which the firing operation commences at a sufficiently slow rate to prevent breakage of the ware. Once the temperature reaches a preselected maximum level, it is then gradually decreased at a controlled rate to ensure that the desired characteristics are imparted to the ware and that the ceramic glaze is not crazed.

The furnace 10 is provided with a temperature sensing device 12 such as a conventional thermocouple for continuously monitoring the temperature inside the furnace 10. The thermocouple 12 is equipped with a test junction located in the furnace 10 and a reference junction maintained at ambient temperature externally of the furnace.

Figure 3:
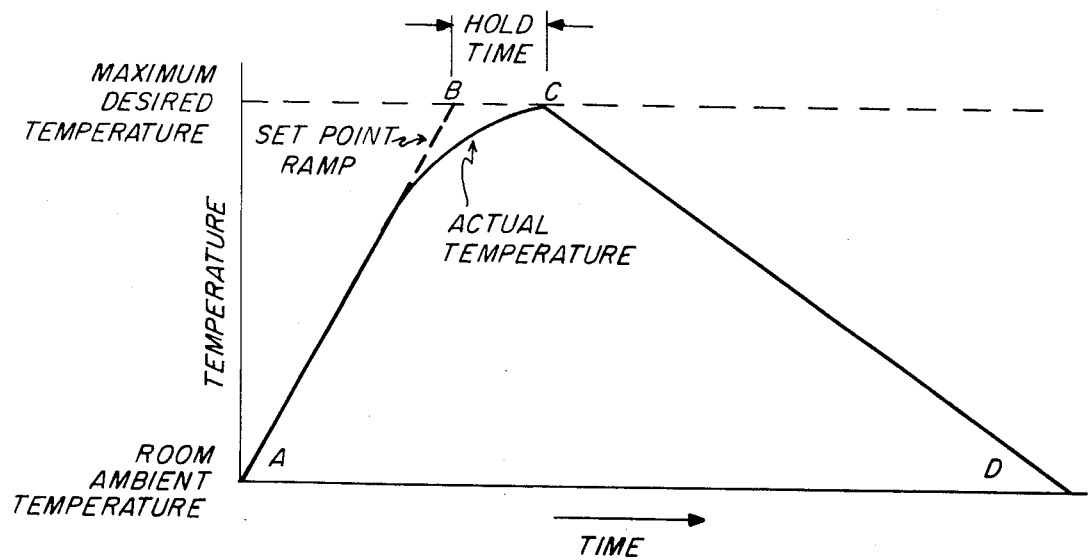
FIG. 3 is a time-temperature plot graphically illustrating the operation of the programmed temperature control system as diagramed in FIG. 1.

As illustrated in FIG. 3, the temperature within the furnace 10 rises from room ambient temperature corresponding to point A on the time-temperature plot as the furnace control elements and the power source in the furnace are actuated. Points B and C represent the maximum preselected temperature level attained in the furnace 10. Once the temperature reaches the preselected value, it gradually decreases to the original room ambient temperature indicated by point D, preferably at a slower rate, as indicated by the interval between points C and D, than that which occurs during the heating cycle from A to C.

A reference junction compensator circuit 14 is associated with the thermocouple 12 to correct the measuring circuit for variations in the ambient temperature. This is required because as characteristic of any conventional thermocouple circuit the E.M.F. produced by the thermocouple circuit is proportional to the difference between the temperatures at its several junctions. In operation, when the ambient temperature changes, the reference junction of the thermocouple 12 changes; however, the compensator 14 will generate an equal and opposite E.M.F. to cancel these effects. The thermocouple E.M.F. is transmitted to a conventional DC integrated circuit preamplifier 16 which raises the millivolt level of the thermocouple E.M.F. to a several volt signal which is visually indicated by a meter 18. The meter 18 continually receives the amplified output of the preamplifier 16. The output is proportional to the furnace temperature measured by the thermocouple 12 to provide an instantaneous indication of the furnace temperature during the heating and cooling cycles.

A temperature controller or comparator 20, such as a summing amplifier, receives output from the preamplifier 16 and from a set point temperature control 22. The set point temperature control 22 may be selected from any variable voltage apparatus such as a set point slidewire potentiometer. The temperature control 22 provides a voltage output which is proportional to the desired maximum temperature level to be reached in the furnace 10.

The voltage output of the summing amplifier 20, as determined by the inputs from the preamplifier 16 and the temperature control 22, serves as an input to the summing amplifier 24 together with signals received from the temperature control 22 and a variable voltage generator 26. The integrated circuit of the variable voltage generator 26 or ramp generator, as it is also known, includes a selected resistance and capacitance for controlling the rate at which the furnace temperature increases and decreases. The output of the ramp generator 26 begins at zero and rises slowly as a function of time until after a predetermined time interval the temperature reaches the programmed maximum level. The output of the ramp generator 26 is controlled by a Zener diode network 28. Thus, by changing the ratio of the break-down voltages of the Zener diodes of the network 28, it is possible to independently adjust the intervals of heating and cooling. This is accomplished by the Zener diodes limiting the input supplied to the ramp generator 26 from the summing amplifier 24.

The output of the ramp generator 26 is fed back to the summing amplifier 24 and also output of the ramp generator 26 is combined with output from the preamplifier 16 to serve as input to the control amplifier 30. The control amplifier 30, in a manner similar to the summing amplifier 20, responds to any difference existing between the actual temperature within the furnace 10 as indicated by the amplified signal from the thermocouple 12 and the output of the ramp generator 26.

When the control amplifier 30 monitors a difference between the two outputs it will, in turn, provide an output to a control relay 32 such as a conventional pilot or power relay associated with the furnace power source. The relay 32 responses to the output received from the amplifier 30 to control the power supplied to the furnace 10. In this manner the control amplifier 30 and relay 32 operate either the heating elements of an electrically heated furnace or the control valve of a furnace heated by fossil fuels. The control relay 32 may be selected from a class of power handling devices such as one or more electro-mechanical relays which may provide a selection of control modes such as proportional mode, reset mode, proportional plus reset mode and time proportional mode.

For operation, once the ware is loaded in the furnace 10, the slidewire potentiometer 22 is set to provide an output corresponding to the maximum temperature indicated by points B and C in FIG. 3. Power is then supplied to the furnace 10. A start switch 34 is engaged to remove the short circuit path from around the capacitors of the ramp generator 26 to thereby assure that its output begins at zero.

Once the ramp generator 26 has been released, the outputs from the preamplifier 16 and the potentiometer 22 are monitored by the summing amplifier 20. The output from the preamplifier 16 will be slight in comparison with that of the potentiometer 22 because of the initial low temperature within the furnace 10. Until the output from the preamplifier 16 is equal to or slightly exceeds the output from the potentiometer 22, the input to the summing amplifier 24 is blocked by a diode 36. Therefore, the output of the summing amplifier 20 remains constant until the furnace 10 reaches the desired preselected maximum temperature. As long as the diode 36 blocks input from the amplifier 20, the output of the summing amplifier 24 is controlled by the sum of the inputs from the potentiometer 22 and the ramp generator 26. In addition, the input to the ramp generator 26 from the summing amplifier 24 is limited by one of the Zener diodes in the Zener diode network 28.

At this point in the firing cycle, the control amplifier 30 will detect the difference between the actual temperature within the furnace 10, represented by the output of the preamplifier 16, and the output of the ramp generator 26. A difference between the two outputs will actuate the control relay 32 to increase the power supplied to the furnace 10 and drive the temperature upward to the desired level. Accordingly, as the temperature rises in the furnace, the difference between the outputs of the ramp generator 26 and preamplifier 16 approaches zero. In this manner the temperature in the furnace 10 is controlled by the output of the ramp generator 26. Since the ramp generator 26 increases its output from zero, the output from the potentiometer 22 is initially greater and therefore establishes the polarity of the summing amplifier 24. As discussed above the input from the summing amplifier 24 to the ramp generator 26 is controlled by the breakdown voltage of one of the Zener diodes in the Zener diode network 28. Thus, the time required to raise the temperature of the furnace 10 to level corresponding to the output of the potentiometer 22 is controlled by the Zener diode network 28.

The output of the ramp generator 26 rises slowly as a function of time. The time rate of increase is dependent upon the input received from the summing amplifier 24 which is, in turn, controlled by the Zener diode network 28, and the resistance aand capacitance parameters of the ramp generator circuit. The output of the ramp generator 26 will increase until it is greater than that of the potentiometer 22. When this condition is reached the polarity of the summing amplifier 24 is reversed, and as a consequence the input to the ramp generator 26 reverses in polarity. The ramp generator 26 responds to this reverse polarity condition to provide a decreasing output at a decreased time rate as determined by a second Zener diode in the Zener diode network 28 and the same resistance and capacitance parameters of the ramp generator circuit.

A decrease in the ramp generator output will be accompanied by a decrease in the temperature of the furnace 10. However, as soon as the output of the ramp generator 26 has decreased to the point where the polarity of the summing amplifier 24 reverses to its original condition, the output of the potentiometer 22 will once again exceed that of the ramp generator 26. The ramp generator 26 then begins to increase its output to raise the temperature to the preselected level. Thus, with this arrangement a control loop is established for adjusting the output of the ramp generator 26 to a magnitude equal to the output of the potentiometer 22 as determined by the accuracy of the summing amplifier 24 to monitor the difference between the two outputs.

Even though the output of the ramp generator 26 might be equal to or slightly greater than the output of the potentiometer 22, the furnace 10 may not have yet reached the preselected maximum temperature. This condition is illustrated in FIG. 3 wherein the dashed line represents the programmed temperature as set by the potentiometer 22 and the solid line represents the actual furnace temperature. This discrepancy between the programmed temperature and the actual furnace temperature is attributed to the characteristics of the heating unit of the furnace 10 so that the temperature in the furnace 10 actually rises at a slower rate than as established by the ramp generator 26. The output of the ramp generator 26 will, however, cease to increase beyond magnitude corresponding to the maximum desired temperature established by the potentiometer 22.

The output of the ramp generator 26 will hold at the magnitude corresponding to the maximum desired temperature indefinitely as indicated by the hold time in FIG. 3 until the actual temperature within the furnace 10 slightly exceeds this preselected maximum temperature. When this condition is reached, the output of the summing amplifier 20 reverses polarity and passes through the diode 36 to the summing amplifier 24.

The summing amplifier 20 is equipped with a latch circuit 40. Start switch 38, which is mechanically coupled with start switch 34, releases the latch circuit 40 at the beginning of the heating cycle. Since the latch circuit is polarity sensitive, it will not operate until the point C, shown in FIG. 3, is reached when summing amplifier 20 reverses in polarity and initiates the cooling portion of the cycle. Thus, the latch circuit 40 functions to maintain the output polarity of summing amplifier 20 in a reversed condition regardless of the condition of the inputs received by the amplifier 20. With this arrangement, operation of the control amplifier 30 and its associated control relay 32 will not interfere with the cooling cycle and subsequently prevent the supply of input voltage from the summing amplifier 20 to the summing amplifier 24.

For the remainder of the cooling cycle the summing amplifier 24 provides output to the ramp generator 26 through the Zener diode network 28 at a polarity which decreases the output of the ramp generator 26 at a controlled time rate. The time rate of change of temperature in the furnace 10 during the cooling cycle preferably differs from the time rate of change during the heating cycle as determined by the Zener diodes in the network 28 and the selected resistance and capacitance of the ramp generator circuit. In FIG. 3 the line CD represents the cooling cycle, and the slope of the line indicates the rate at which the temperature in the furnace 10 is reduced from a maximum level to room temperature. The slope of the line AC representing the heating cycle is greater than the slope of the line CD to indicate that the temperature control system of the present invention provides independent heating and cooling rates.

Figure 2:
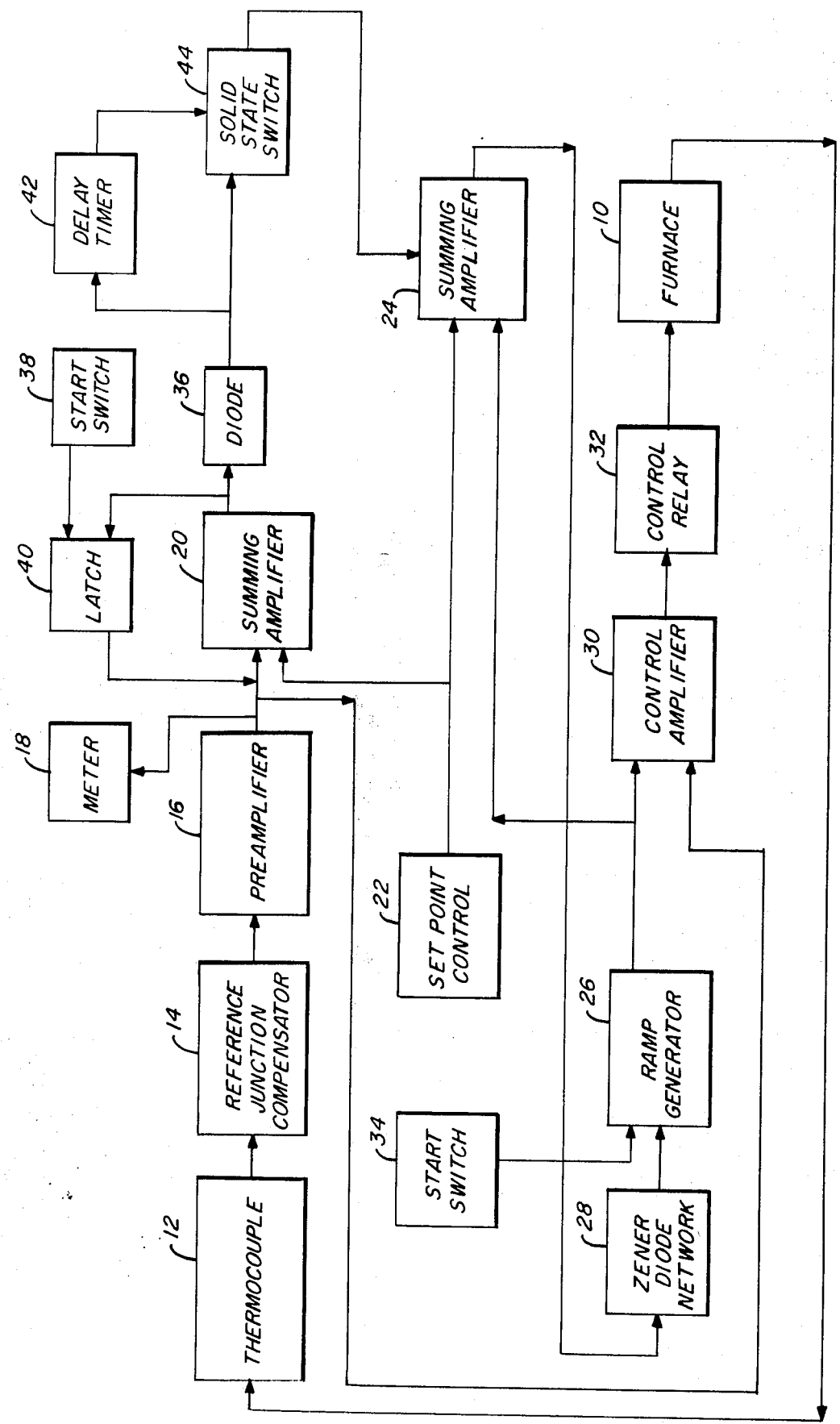
FIG. 2 is a block diagram similar to FIG. 1 illustrating the control elements for a programmed temperature control system in which a provision is made for maintaining the temperature of the furnace at a desired programmed level for a predetermined time interval.
Figure 4:
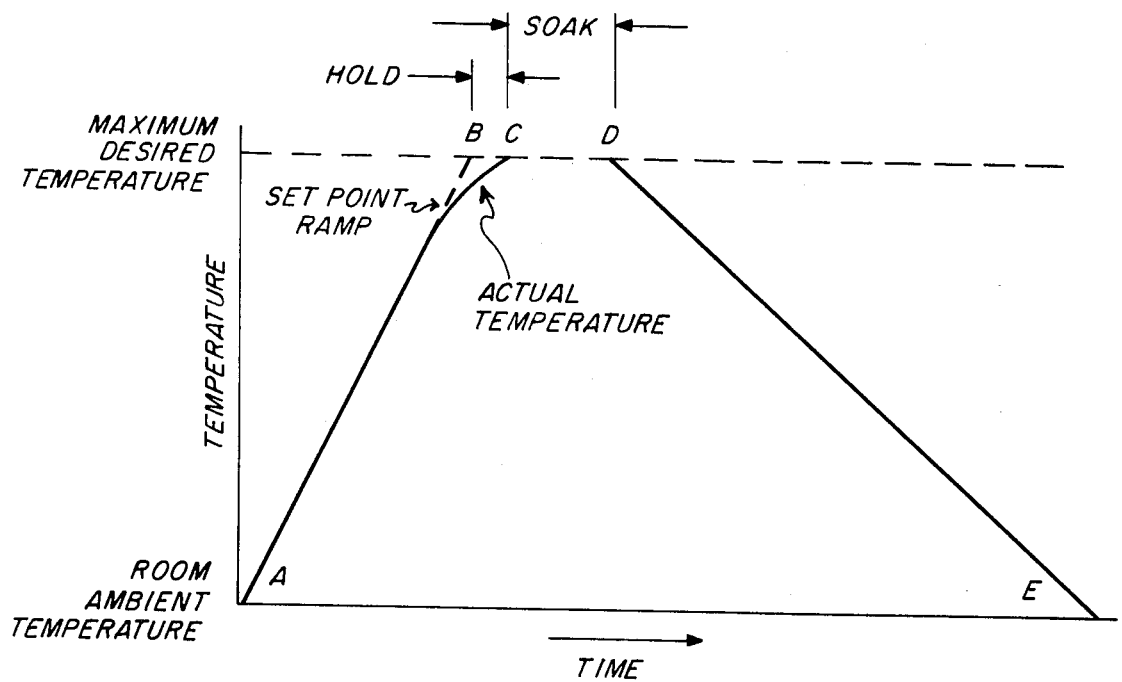
FIG. 4 is a time-temperature plot similar to FIG. 3 graphically illustrating the operation of the programmed temperature control system as diagramed in FIG. 2.

As illustrated by FIGS. 2 and 4, the above described program temperature control system may be modified to include a soak time at a preselected maximum temperature. The soak time is the time interval subsequent to the ramp stage when the control amplifier 30 and control relay 32 supply a correction signal to the furnace power source to drive the temperature in the furnace 10 to the programmed level at a predetermined rate even though the potentiometer 22 has reached an output corresponding to the preselected maximum temperature. In FIG. 4 the soak interval or the interval during which the temperature of the furnace is held at the desired program level is represented by the line CD. The modification required to be made to the basic control circuit is illustrated in FIG. 2. A solid state delay timer 42 is provided to receive the signal from summing amplifier 20 through diode 36. A field effect transistor, which functions as a solid state switch 44, blocks the input to summing amplifier 24 from summing amplifier 20 during the soak interval from the time at which delay timer 42 receives a signal and is energized, graphically illustrated by point C of FIG. 4 until the delay timer 42 is deenergized, graphically illustrated by point D of FIG. 4. The length of the soak interval is determined by the resistance and capacitance parameters of the delay timer 42 circuit.

When the delay time has expired, and solid state switch 44 is again placed in a conducting mode, the output of the summing amplifier 24 reverses in polarity as discussed hereinabove. The cooling cycle commences after the soak interval as illustrated at point D of FIG. 4. The cooling cycle terminates when the furnace 10 reaches room ambient temperature represented by point E.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:
1. A programmed temperature control system for a furnace comprising,
   means for sensing the temperature within said furnace,
   means for indicating the temperature within said furnace,
   means for setting a fixed preselected maximum temperature within said furnace,
   variable voltage means for increasing and decreasing the temperature of said furnace at a controlled rate,
   means for controlling the supply of power to said furnace responsive to output of said variable voltage means,
   first amplifier means for receiving input signals from said temperature sensing means and said temperature setting means,
   second amplifier means for receiving input signals from said first amplifier means, said temperature setting means and said variable voltage means to maintain said variable voltage means at the output of said temperature setting means for an indefinite period of time until the temperature in said furnace reaches said preselected maximum temperature, and
   diode means for controlling the input of signals from said second amplifier means to said variable voltage means to thereby adjust the rate of temperature increase and decrease in said furnace.

2. A programmed temperature control system for a furnace as set forth in claim 1 in which said variable voltage means includes,
   a ramp generator arranged to receive input signals from said diode means and provide a corresponding output signal to said means for controlling the supply of power to said furnace at a preselected rate, and
   said diode means operable to actuate said ramp generator to increase the furnace temperature to said preselected maximum temperature and thereafter decrease the furnace temperature therefrom to room ambient temperature.

3. A programmed temperature control system for a furnace as set forth in claim 1 which includes, said first amplifier means for receiving input signals includes a first summing amplifier, said second amplifier means for receiving input signals includes a second summing amplifier, a blocking diode connecting said first and second summing amplifiers, said blocking diode operable to prevent signal input supplied from said first summing amplifier to said second summing amplifier until the temperature in said furnace reaches said preselected maximum temperature.

4. A programmed temperature control system for a furnace as set forth in claim 1 which includes, feedback means for adjusting the output of said variable voltage means to a magnitude of the output of said maximum temperature setting means to thereby control the rate of temperature increase in said furnace.

5. A programmed temperature control system for a furnace as set forth in claim 3 which includes, said first summing amplifier operable to provide an output signal when the temperature within said furnace reaches said preselected maximum temperature, and said second summing amplifier arranged to supply output signals of both forward and reverse polarity to said variable voltage means for first increasing the output signal of said variable voltage means until the magnitude thereof exceeds the output signal of said temperature setting means, said second summing amplifier thereafter operable to alternately increase and decrease the output signal of said variable voltage means and thereby maintain the output signal thereof equal to the output signal of said temperature setting means for a indefinite period of time until said second summing amplifier receives an input signal from said first summing amplifier and supplies an output signal for decreasing the output signal of said variable voltage means.

6. A programmed temperature control system for a furnace as set forth in claim 5 which includes, means for delaying the input signal to said second summing amplifier from said first summing amplifier for a predetermined period of time so that the temperature within the furnace remains at said preselected maximum temperature for a predetermined period of time before beginning to decrease.

7. A programmed temperature control system for a furnace as set forth in claim 6 in which said delaying means includes, a solid state switching device, and a solid state delay timer arranged to provide said solid state switching device with an output signal for a predetermined period of time from the time said first summing amplifier reverses in polarity corresponding to the time at which the temperature in said furnace exceeds said preselected maximum temperature, said solid state switching device operable to withhold the output signal of said first summing amplifier from the input of said second summing amplifier when said solid state switching device receives input from said solid state timer.

8. A programmed temperature control system for a furnace as set forth in claim 4 in which said feedback means includes, said second amplifier means, said variable voltage means, a Zener diode network arranged to receive input signals from said second amplifier means and to supply input signals to said variable voltage means, said Zener diode network having a plurality of Zener diodes of preselected breakdown voltages such that the input signals to said variable voltage means are controlled by a selected one of said Zener diodes, and means for regulating the power supplied to said furnace to thereby raise and lower the temperature of said furnace, said variable voltage means operable to actuate said power regulating means and raise the temperature of said furnace in response to the input signals from said second amplifier means, said second amplifier means operable to monitor the output signals of said temperature setting means and responsively supply input signals to said variable voltage means so that said regulating means supplies power to said furnace to heat said furnace to the temperature provided by said temperature setting means.

* * * * *